United States Patent
Berkner et al.

(10) Patent No.: US 9,250,131 B2
(45) Date of Patent: Feb. 2, 2016

(54) MULTI-IMAGING SYSTEM WITH INTERLEAVED IMAGES

(75) Inventors: Kathrin Berkner, Los Altos, CA (US); Keith Bennett, Palo Alto, CA (US)

(73) Assignee: Ricoh Co., Ltd., Tokyo (JP)

( * ) Notice: Subject to any disclaimer, the term of this patent is extended or adjusted under 35 U.S.C. 154(b) by 572 days.

(21) Appl. No.: 13/007,901

(22) Filed: Jan. 17, 2011

(65) Prior Publication Data

US 2012/0182438 A1 Jul. 19, 2012

(51) Int. Cl.
| | |
|---|---|
| *H04N 5/225* | (2006.01) |
| *G01N 21/25* | (2006.01) |
| *H01L 27/00* | (2006.01) |
| *G01J 3/36* | (2006.01) |
| *G01J 3/28* | (2006.01) |

(52) U.S. Cl.
CPC . *G01J 3/36* (2013.01); *G01J 3/2823* (2013.01)

(58) Field of Classification Search
CPC ........ G01J 3/36; G01J 3/2823; A61B 1/0684; A61B 5/082; A61B 5/097; A61B 17/3421; A61B 1/00186; G01N 1/2205; H01L 27/322; H04N 19/117; H04N 19/82; H04N 5/2258; H04N 9/045; H04N 9/09; H04N 9/097
USPC ............... 348/335, 340, 342, 343; 250/208.1; 356/303, 419
See application file for complete search history.

(56) References Cited

U.S. PATENT DOCUMENTS

| | | | |
|---|---|---|---|
| 5,926,283 A * | 7/1999 | Hopkins | 356/419 |
| 5,982,497 A | 11/1999 | Hopkins | |
| 6,313,960 B2 * | 11/2001 | Marquiss et al. | 359/892 |
| 6,927,836 B2 * | 8/2005 | Nishinaga | 355/53 |
| 7,433,042 B1 * | 10/2008 | Cavanaugh et al. | 356/419 |
| 7,663,690 B2 * | 2/2010 | Kurosawa | 348/370 |
| 8,143,565 B2 | 3/2012 | Berkner et al. | |
| 2001/0021074 A1 * | 9/2001 | Marquiss et al. | 359/892 |
| 2003/0007254 A1 | 1/2003 | Tocci | |
| 2006/0077284 A1 * | 4/2006 | Kurosawa | 348/371 |
| 2008/0204744 A1 * | 8/2008 | Mir et al. | 356/303 |
| 2008/0266655 A1 | 10/2008 | Levoy et al. | |
| 2011/0073752 A1 * | 3/2011 | Berkner et al. | 250/227.2 |

FOREIGN PATENT DOCUMENTS

EP 2065743 B1 1/2011

OTHER PUBLICATIONS

Horstmeyer, R. et al., "Flexible Multimodal Camera Using a Light Field Architecture," IEEE Conference on Computation al Photography, 2009, pp. 1-8.
European Extended Search Report, European Application No. 12150848.5, Aug. 10, 2015, 6 pages.

* cited by examiner

*Primary Examiner* — Twyler Haskins
*Assistant Examiner* — Carramah J Quiett
(74) *Attorney, Agent, or Firm* — Fenwick & West LLP

(57) ABSTRACT

A multi-imaging device includes a multiplexed optical system and a filter fixture. The multiplexed optical system forms multiple optical images of an object. These multiple optical images are interleaved at the sensor plane. The filter fixture is configured to allow a user to change filter assemblies. The filter assemblies can include different filter regions, which apply different filtering to the optical images.

19 Claims, 5 Drawing Sheets

MULTI-IMAGING SYSTEM WITH INTERLEAVED IMAGES

BACKGROUND OF THE INVENTION

1. Field of the Invention

This invention relates generally to imaging systems that can capture multiple images of the same object simultaneously, for example images of different spectral or polarization components of the object.

2. Description of the Related Art

There are many applications for which it may be useful to capture multiple images of the same object simultaneously. These images may be filtered in different ways, thus providing different information about the object. For example, in multispectral and hyperspectral systems, different wavelength filters may be used to acquire spectral information, and this information may then be used for spectral analysis or identification of substances or the measurement of molecules or other items labeled with fluorophores.

Acquiring these multiple images can be difficult since most commercially available sensor arrays are designed to capture one image at a time. Traditionally, multiple images were acquired simply by time multiplexing (e.g., capturing images one after another in time) or by using two or more imaging systems or detector arrays in parallel.

For example, spectral imaging applications may use a single image camera in connection with a filter wheel. The filter wheel contains wavelength filters that correspond to the wavelength bands of interest. At any one time, only one of the wavelength filters is positioned in the imaging path and the camera captures the filtered image. The filter wheel rotates in order to switch from one wavelength filter to the next, with the camera capturing images one after another. Thus, the multispectral imaging is implemented in a time multiplexed manner. However, the resulting systems can be large and complicated.

An alternate approach is based on dispersive elements such as prisms or gratings. In this approach, dispersive elements are used to spatially separate different wavelengths. The light is typically dispersed along one dimension of the detector array. The other dimension is used to capture one spatial dimension of the object. However, it is difficult to also capture the second spatial dimension of the object. Sometimes, time multiplexing is introduced to capture the second spatial dimension, for example by scanning.

Yet another approach is to use multiple cameras or imaging systems in parallel. Each camera is fitted with a different spectral filter and the bank of cameras capture filtered images simultaneously. However, this increases the overall cost and complexity since the amount of hardware required is significantly increased. In addition, bulky camera systems may introduce parallax problems.

For some applications, it may be possible to attach filters individually to each sensor element. For example, a conventional RGB imaging device may be based on a detector array where red, green and blue filters are attached to each individual detector. The Bayer pattern is one common pattern for arranging these micro-filters on the detector array. However, one disadvantage of this approach is the increased cost and complexity of manufacturing. Because there is a one-to-one correspondence between micro-filters and detectors, and because the micro-filters are attached to the detectors, the micro-filters are the same size as the detectors, which is small. The many different small micro-filters must then be arranged into an array and aligned with the underlying detectors. This may be difficult, especially if a large number of different types of micro-filters are required. Another disadvantage is the lack of flexibility. Once the micro-filter array is attached to the detector array, it is difficult to change the micro-filter array.

Thus, there is a need for better multi-imaging systems, including multispectral and polarization imaging systems.

SUMMARY OF THE INVENTION

The present invention overcomes the limitations of the prior art by providing a multi-imaging device that includes a multiplexed optical system and a filter fixture. The multiplexed optical system forms multiple optical images of an object. These multiple optical images are interleaved at the sensor plane. The filter fixture is configured to allow a user to change filter assemblies. The filter assemblies can include different filter regions, which apply different filtering to the optical images.

In one embodiment, the multiplexed optical system may include an objective lens and an array of image-forming elements. The objective lens forms an image at an image plane. The array is located at the image plane and images the filter assembly onto the sensor plane. That is, the filter assembly and filter fixture are located at a conjugate plane to the sensor plane, which also is an aperture plane for the optical system (e.g., at the aperture stop or telecentric stop of the optical system). In this way, multiple interleaved optical images are produced at the sensor plane.

Different types of filter assemblies can be used. In one example, the filter assembly is a spatially multiplexed filter assembly with a (rectangular) array of filter regions. In some variations, the user can adjust a size of at least one filter region in the filter assembly, or the relative size between two filter regions. In another approach, the user can physically replace at least one filter region in the filter assembly with a different filter region. Filter regions can be designed to have different responses, including wavelength, polarization, luminance, and neutral density.

Examples of applications include microscopes, scientific and analytic instruments, environmental sensing and medical imaging optics.

Other aspects of the invention include methods corresponding to the devices and systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
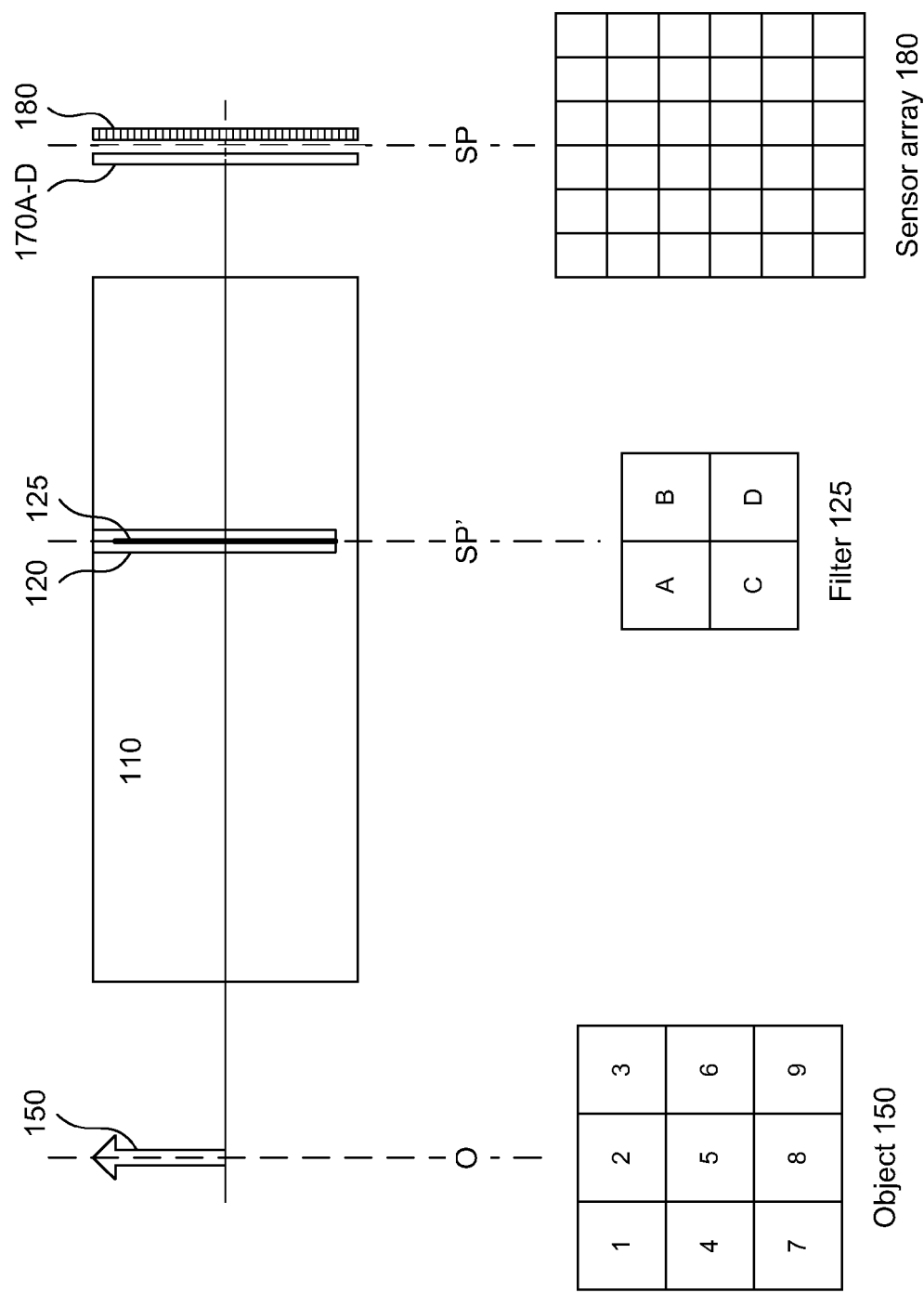
FIGS. 1A and 1B are diagrams illustrating an example of a multi-imaging device according to the invention.

FIG. 1A illustrates an example of a multi-imaging device according to the invention. Referring to the top portion of FIG. 1A, the device includes a multiplexed optical system 110 that forms multiple optical images 170A-D of an object 150. The multiple optical images 170A-D are formed at a sensor plane SP and the images are interleaved, as will be described in more detail below. A sensor assembly 180 located at the sensor plane detects the optical images 170A-D. A filter fixture 120 is positioned at a conjugate plane SP' of the sensor plane SP. The filter fixture holds a filter assembly 125. In this example, the filter assembly is spatially multiplexed and includes a rectangular array of different filter regions 125A-D, as shown in the bottom portion of FIG. 1A.

The bottom portion of FIG. 1A provides more detail. In this diagram, the object 150 is divided into a 3×3 array of regions, which are labeled 1-9. The filter assembly 125 is a 2×2 rectangular array of four filter regions, labeled A-D. For example, each filter region 125A-D might have a different spectral response. The sensor array 180 is shown as a 6×6 rectangular array.

Figure 1B:
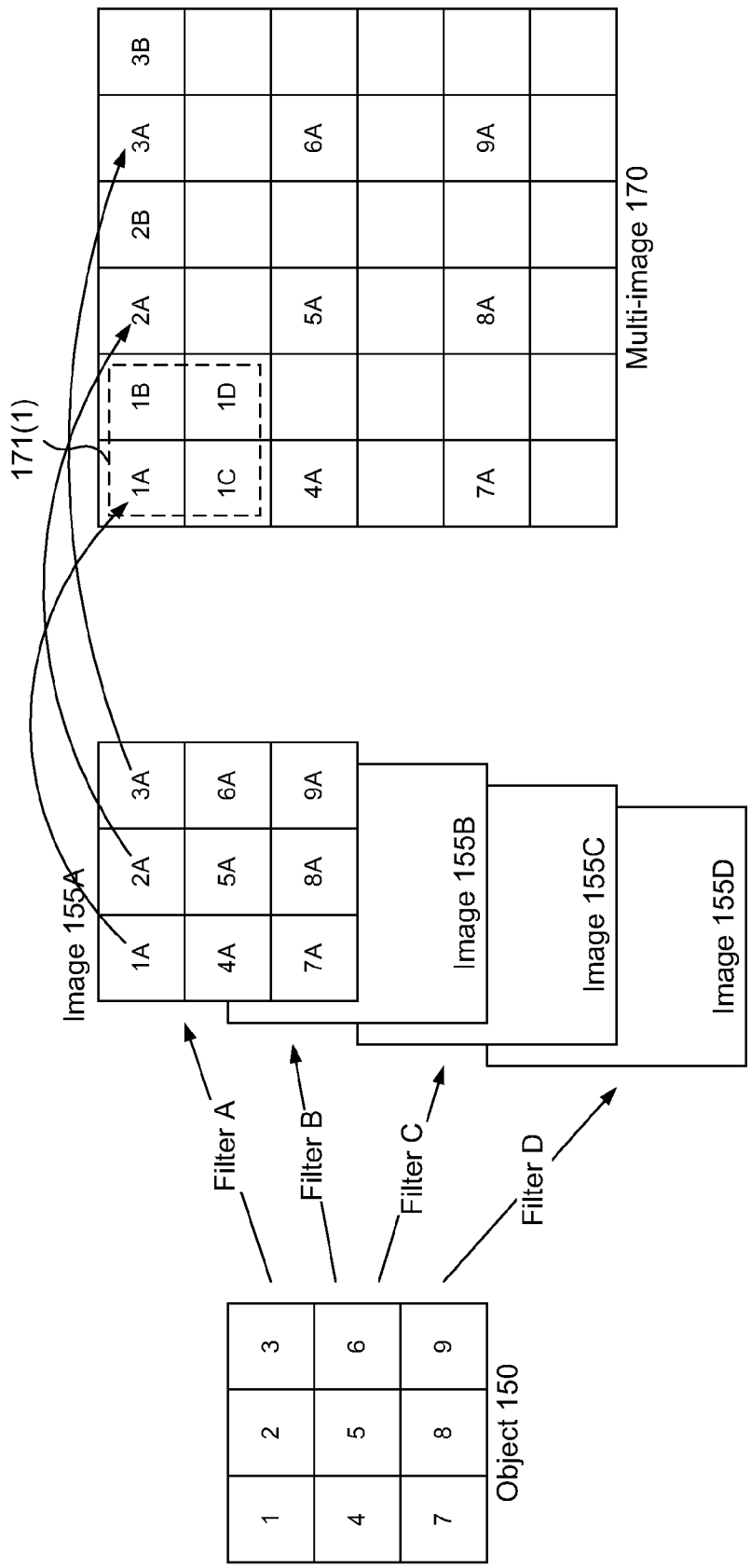

FIG. 1B illustrates conceptually how the different optical images 170A-D are produced and interleaved at sensor array 180. The object 150, if captured and filtered by filter region 125A, would produce an optical image 155A. To distinguish optical image 155A from an unfiltered image of the object, the 3×3 regions are labeled with the suffix A: 1A-9A. Similarly, the image 150 filtered by filter regions 125B,C,D, would produce corresponding optical images 155B,C,D with 3×3 regions labeled 1B-9B, 1C-9C and 1D-9D. Each of these four optical images 155A-D is filtered by a different filter region 125A-D within filter assembly 125 but they are all produced simultaneously by the multiplexed optical system 110.

The four optical images 155A-D are formed in an interleaved fashion at the sensor plane, as shown in FIG. 1B. Using image 155A as an example, the 3×3 regions 1A-9A from optical image 155A are not contiguous in a 3×3 block within optical image 170. Rather, regions 1A, 1B, 1C and 1D, from the four different optical images, are arranged in a 2×2 fashion in the upper left of optical image 170. Regions 2-9 are similarly arranged. Thus, the regions 1A-9A that make up optical image 170A are spread out across the composite optical image 170, separated by portions of the other optical images 170B-D. Put in another way, if the sensor is a rectangular array of individual sensor elements, the overall array can be divided into rectangular subarrays 171(1)-(9) of sensor elements (only one subarray 171(1) is shown in FIG. 1B). For each region 1-9, all of the corresponding regions from each filtered image are imaged onto the subarray. For example, regions 1A, 1B, 1C and 1D are all imaged onto subarray 171(1).

It should be noted that the arrays shown in FIG. 1 have been simplified to illustrate underlying concepts. For example, the object 150 was artificially divided into an array in order to more easily explain the overall imaging function. The invention is not limited to arrayed objects. As another example, most practical systems will use significantly larger arrays, particularly at the sensor assembly and possibly also at the filter assembly. In addition, there need not be a 1:1 relationship between the 6×6 regions at the sensor plane and the underlying sensor elements in the sensor array. Each region could correspond to multiple sensor elements, for example.

As a final example, the regions labeled 1 in the object, 1A in the filtered image 155A and 1A in the composite image 170 do not have to be exact images of each other. In some designs, region 1A within image 170 may capture the filtered energy approximately from region 1 in the object 150, but it may not actually be an image of region 1. Thus, the energy collected by sensor elements in region 1A of image 170 may be integrating and sampling the image in region 1 in object 150, rather than representing a geometrical reproduction of the image of that region. In addition, effects such as parallax and vignetting may affect any image formation.

The approach shown in FIG. 1 has several advantages. First, multiple optical images 170A-D are captured simultaneously at the sensor plane. Second, the captured images are filtered by filter assembly 125, and the various filter regions 125A-D within filter assembly 125 may implement different filtering functions. Furthermore, the filter fixture 120 holding the filter assembly is designed so that the filter assembly 125 can be easily changed by the user. In this way, the user can easily change the filtering functions. In addition, since the filter assembly 125 is located at a conjugate plane SP' rather than the actual sensor plane SP, and since this typically means that the filter assembly will be much larger compared to what would be required at the sensor plane, the tolerances and other mechanical requirements are relaxed. This makes it easier to manipulate the filter assembly, compared to if the filter assembly were located at the sensor plane (e.g., if attached to the sensor assembly).

Figure 2:
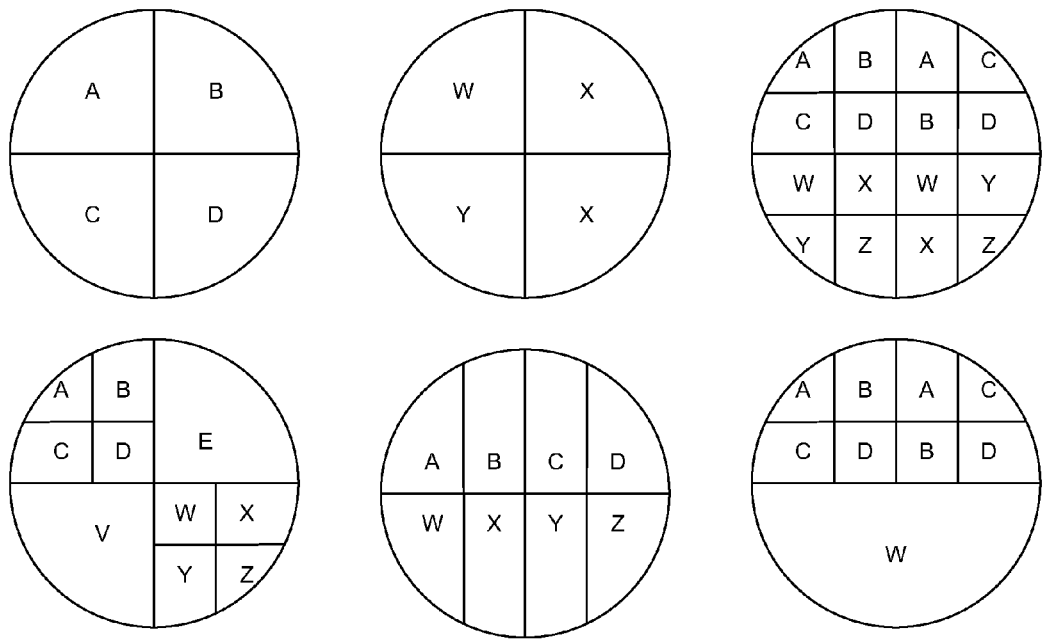
FIG. 2 is a diagram of a set of filter assemblies.
Figure 3:
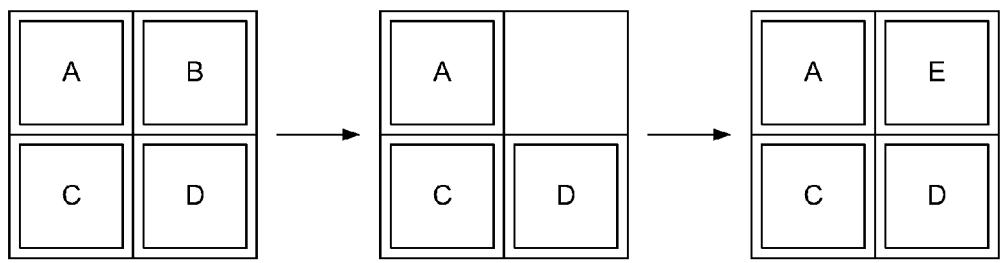
FIG. 3 is a diagram of a filter assembly where filter regions can be changed.
Figure 4:
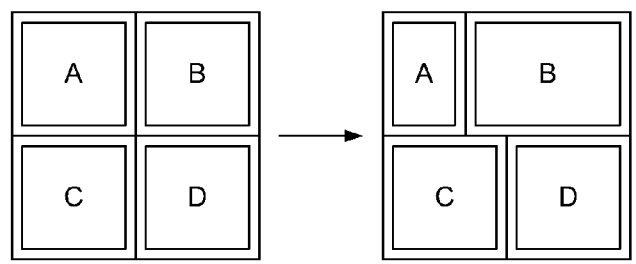
FIG. 4 is a diagram of a filter assembly where the size of the filter region can be adjusted.

FIGS. 2-4 illustrate various designs for filter assemblies. In FIG. 2, the user has a set of six filter assemblies, each of which can be inserted into the filter fixture. In this example, each of the filter assemblies is based on a rectangular array of filter regions, where each filter region may be the same or different. The different letters A,B,C, etc. represent different filter regions. The filter assemblies may be custom-made or off-the-shelf items. The filters may be fabricated using various technologies, including thin-film interference, glass or plastic absorption, or sub-wavelength photonic structures for example. The individual filter regions may also be custom-mode or off-the-shelf. This approach may be useful for various applications, including the following:

1) Detection of materials by spectroscopy: Each filter assembly might correspond to the spectral profile (for example, absorption, emission or Raman) of a different material or group of materials, and the set of filter regions within one filter assembly would be designed to identify the specific material or group of materials.

2) Detection of materials by spectroscopy: Each filter assembly might correspond to the spectral profile of a different material embedded in some background spectral signature. The set of filter regions within one filter assembly would depend on the spectroscopic signature of that material and that of the background.

3) Classification of materials by spectroscopy: Each filter assembly might correspond to the spectral profiles of two or more different materials, and the set of filter regions within one filter assembly would depend on the spectroscopic signatures of the set of materials. Example applications include classification of oxygenated and deoxygenated blood, the spatial distribution of constituents of a pharmaceutical pill, or identification of optically labeled molecules or stained materials.

4) Identification of molecules labeled by fluorophores or chromopores: Labeling of specific molecules, such as proteins or DNA/RNA sequences is a widely used method to make it possible to optically detect such molecules with specificity and sensitivity. For example, this method is broadly used in biology research, including microscopy, pathology such as immunohistochemistry (IHC) and fluorescence in situ hybridization (FISH) in-vitro diagnostics and genetic sequencing. Any of the methods (1)-(3) above may be used in combination with labeling methods.

5) RGB imaging+material detection: Each filter assembly might correspond to detection of a different flourophore while simultaneously enabling RGB imaging. The set of filter regions within one filter assembly would depend on RGB filters for photographic imaging and the fluorescence signal (s) of the material(s) to be imaged. Example applications include an endoscope, microscopy, histology where a fluorophore is used to label a particular constituent of interest in addition to a stain, such as hematoxylin and eosin (H & E) used to show anatomic tissue structure, or during surgery.

6) RGB imaging+high dynamic range imaging: Each filter assembly might correspond to RGB imaging at different illumination conditions. The set of filter regions within one filter assembly would depend on RGB filters for photographic imaging and neutral density filters depending on the illumination conditions.

7) RGB imaging+surface condition detection: Each filter assembly might correspond to detection of a different material surface condition while simultaneously enabling RGB imaging. The set of filter regions within one filter assembly would depend on RGB filters for photographic imaging and polarization filters depending on the surface conditions.

8) Switching from RGB imaging to fluorescence imaging. Since the filters are removable, this implementation enables cameras to be switched from RGB (or any set of filters) to, for example, monochrome imaging. A specific application would be microscopy imaging where the researcher desires to take some images in color, but other images with specific spectral selection, as is commonly done in biological research. Tunable spectral filters designed for this type of application are available from Cambridge Research & Instrumentation, Inc. (CRi) of Woburn, Mass.

9) Material detection+high dynamic range imaging: Each filter assembly might correspond to a different material at different illumination conditions. The set of filter regions within one filter assembly would depend on the spectroscopic signature of the material and neutral density filters depending on the illumination conditions. Applications may include agriculture monitoring where plants are inspected in the field at different times of the day.

10) Extended dynamic range: Each filter assembly might have one or more filter sections without any filter installed, but other filter section(s) with neutral density or other attenuation filters installed. This method can be used to make a camera with extended dynamic range, and would be useful for taking images of objects with contrast larger than that of individual pixels in the sensor array.

In FIG. 3, different filter regions are assembled into a filter assembly, but the filter assembly is designed so that the user can replace some or all of the filter regions. On the left, the filter assembly includes regions A,B,C,D. In the middle, filter region B has been removed. On the right, it has been replaced by filter region E. This can be done manually by the user, or can be designed to be done automatically.

This approach may be useful in the following situations, as example. In RGB imaging+material detection, the filter regions for the RGB filters stay and the filter regions for the material detection changes to detect different materials. In this case, the RGB filters form a base set for the filter assembly. In RGB imaging or material detection+high dynamic range imaging, the filter regions for neutral density filters can be changed to address different illumination conditions. In Detection of material by spectroscopy, there might be a base set of filters, and different combinations of those base filters are used for different materials or fluorophores. In Application with reference signature, there are some filters depending on a reference signature of a material. Additional filters are swapped in and out to measure information with respect to the reference signature (e.g. in case of different spectral signatures with common background or component).

In FIG. 4, the user can change the size of different filter regions. In this example, filter regions A and B and the boundary between them can be slid left and right, as shown. In the left figure, A and B have equal areas. In the right figure, the boundary is changed so that A has less area than B. This changes the area ratio between the two filter regions. Equal areas may be desired for certain applications. Other applications may benefit from unequal areas, for example to achieve equal signal-to-noise ratios or to account for different sensitivities.

One example is imaging of an infrared fluorophore in a visible background. The fluorescent intensity is typically much weaker than the visible intensity. Using filters with different spectral weights (i.e. larger area for the fluorescence wavelength and smaller areas for the RGB portion) can improve image quality. A specific application is intra-operative imaging using a fluorescent dye or contrast agent, as it is usually desirable to see the visual image to provide a location reference along with a fluorescent image to provide specific biophysical information (e.g. presence or absence of cancer).

FIGS. 2-4 are just examples. Other variations and combinations of the above examples will be apparent. In addition, each of the above examples uses one filter assembly at a time. The filter fixture can be designed to hold more than one filter assembly. Different combinations of wavelength, polarization, neutral density, luminance and neutral density filters can be used.

Figure 5:
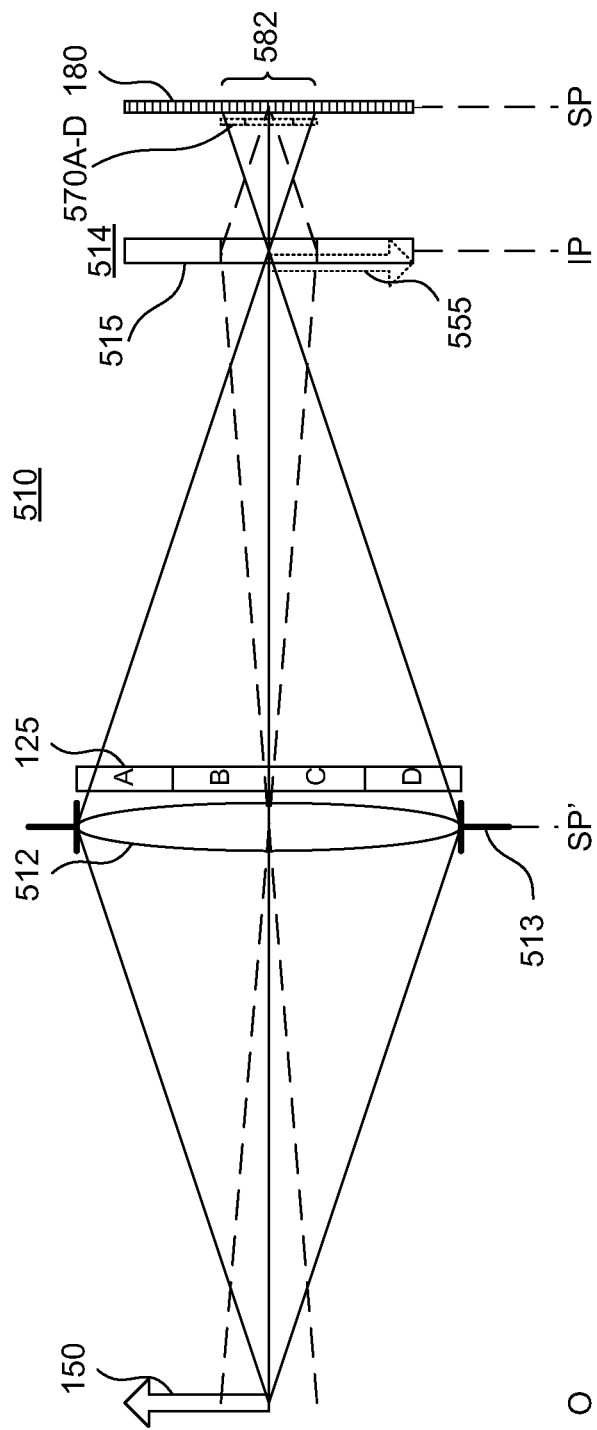
FIG. 5 is a diagram of an example multiplexed optical system according to the invention.

FIG. 5 is a diagram of an example multiplexed optical system 510 according to the invention. The system 510 includes an objective lens 512 and an array 514 of imaging-forming elements 515. The objective lens 512 is shown as a single element in FIG. 5, but it should be understood that it could contain multiple elements. The objective lens 512 forms an optical image 555 of the object 150 at an image plane IP. The array 514 is located at the image plane IP and forms the interleaved multiple optical images 570 at the sensor plane SP. Examples of arrays 514 include microlens arrays and arrays of pinholes. The sensor array 180 is also shown in FIG. 5.

In this example, the filter fixture 120 and filter assembly 125 are located at the conjugate plane SP', which in this example is also the plane where the aperture stop 513 (or telecentric stop) is located. In FIG. 5, the filter assembly 125 is located somewhere between the front surface of objective lens 512 (i.e., the surface closest to the object) and the image plane IP.

Since the filter assembly 125 and sensor assembly 180 are located in conjugate planes, each imaging element 515 in array 514 forms an image of the filter assembly 125 at the sensor plane SP. Since there are multiple imaging elements, multiple images of the filter assembly 125 are formed. Referring to FIG. 1B, subarray 582 in FIG. 5 corresponds to subarray 171 in FIG. 1B, and regions 570A,B,C,D in FIG. 5 correspond to regions 1A, 1B, 1C, 1D of multi-image 170 in FIG. 1B. Each region 570A,B,C,D in FIG. 5 corresponds to a specific region of the object and a specific region 125A,B,C,D in the filter assembly.

Figure 6:
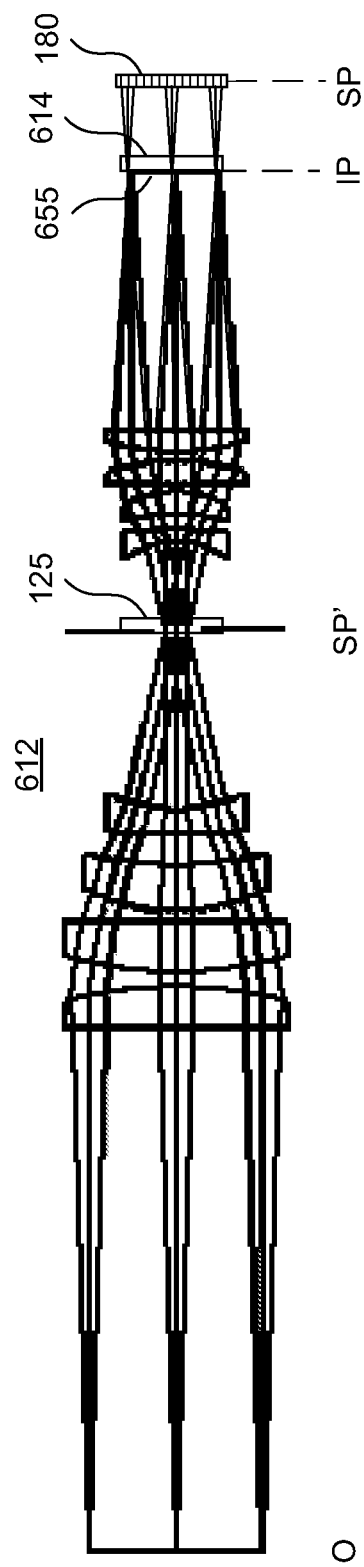
FIG. 6 is a diagram of another multiplexed optical system according to the invention.

FIG. 6 shows a telecentric example. In this example, a telecentric objective lens 612 forms an optical image 655 at image plane IP. The filter fixture 120 and filter assembly 125 are located at the telecentric stop, at plane SP'. An array 614 of imaging elements is located at the image plane IP. These imaging elements image the filter assembly 125 onto the sensor assembly 180, located at sensor plane SP. Thus, the telecentric stop and filter assembly 125 are located at conjugate plane SP'.

This type of implementation may be used in telecentric applications, including microscopes as an example. In a microscope application, the filter fixture preferably is located at the telecentric stop within the "infinity section" of the microscope. Other applications, whether telecentric or not, include medical imaging systems for example.

Although the detailed description contains many specifics, these should not be construed as limiting the scope of the invention but merely as illustrating different examples and aspects of the invention. It should be appreciated that the scope of the invention includes other embodiments not discussed in detail above.

For example, many types of filter arrays can be implemented and filtering can also be implemented at other points in the system. For example, the invention does not prevent the use of traditional micro-filters with the sensor array. Various types of optics can also be used, including reflective and catadioptric systems. Finally, terms such as "light" and "optical" are not meant to be limited to the visible or purely optical regions of the electromagnetic spectrum, but are meant to also include regions such as the ultraviolet and infrared (but not be limited to these).

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A multi-imaging device for capturing multiple images of an object, the device comprising:
    a multiplexed optical system that simultaneously forms multiple optical images of an object, the multiple optical images formed at a sensor plane, wherein the multiple optical images are interleaved at the sensor plane; and
    a filter fixture located at a conjugate plane to the sensor plane, the filter fixture allowing a user of the multi-imaging device to insert different filter assemblies into the filter fixture; wherein for filter assemblies that are spatially multiplexed with different filter regions of a size and location appropriate for the multiplexed optical system, the filter fixture positions the inserted filter assembly so that different optical images are filtered by different filter regions of the filter assembly before reaching the sensor plane.

2. The multi-imaging device of claim 1 wherein the multiplexed optical system includes an objective lens that forms a single image of the object at a first image plane, and the filter fixture is positioned between a front surface of the objective lens and the first image plane.

3. The multi-imaging device of claim 2 wherein the multiplexed optical system is telecentric and the filter fixture is positioned at a telecentric stop of the multiplexed optical system.

4. The multi-imaging device of claim 2 wherein the filter fixture is positioned at an aperture stop of the multiplexed optical system.

5. The multi-imaging device of claim 1 wherein the filter fixture is configured to hold two or more filter assemblies at a same time.

6. The multi-imaging device of claim 1 further comprising:
    a sensor assembly positioned at the sensor plane, the sensor assembly including an array of sensor elements, wherein:
        the array of sensor elements can be grouped into subarrays of sensor elements;
        each of the multiple optical images can be subdivided into regions; and
        a region for one of the optical images is imaged onto the same subarray of sensor elements as the same region for any of the other optical images.

7. The multi-imaging device of claim 6 wherein the filter assembly is a spatially multiplexed filter assembly with a rectangular array of filter regions.

8. The multi-imaging device of claim 6 wherein the filter fixture further allows the user of the multi-imaging device to adjust a size of at least one filter region in the filter assembly while the filter assembly is inserted in the filter fixture.

9. The multi-imaging device of claim 6 wherein the filter fixture further allows the user of the multi-imaging device to adjust a relative size of at least one filter region in the filter assembly relative to another filter region in the filter assembly while the filter assembly is inserted in the filter fixture.

10. The multi-imaging device of claim 6 wherein the filter fixture further allows the user of the multi-imaging device to physically replace at least one filter region in the filter assembly with a different filter region.

11. The multi-imaging device of claim 6 wherein the filter assembly includes filter regions with different spectral responses.

12. The multi-imaging device of claim 6 wherein the filter assembly includes filter regions with different polarization responses.

13. The multi-imaging device of claim 6 wherein the filter assembly includes filter regions with different luminance filters.

14. The multi-imaging device of claim 6 wherein the filter assembly includes filter regions with different neutral density filters.

15. The multi-imaging device of claim 1 wherein the multiplexed optical system is a microscope optical system.

16. The multi-imaging device of claim 1 wherein the multiplexed optical system is a medical imaging optical system.

17. The multi-imaging device of claim 1 wherein the multiplexed optical system comprises:
    an objective lens that forms a single image of the object at a first image plane;
    an array of imaging forming elements located at the first image plane, the array of imaging forming elements forming the interleaved multiple optical images at the sensor plane.

18. The multi-imaging device of claim 17 wherein the array of imaging forming elements includes an array of pinholes.

19. The multi-imaging device of claim 17 wherein the array of imaging forming elements includes an array of microlenses.

* * * * *